United States Patent
Moore

[15] 3,693,261
[45] Sept. 26, 1972

[54] ANGLE TRISECTOR
[72] Inventor: William M. Moore, 1578 Scotty St., San Jose, Calif. 95122
[22] Filed: June 2, 1970
[21] Appl. No.: 42,724

[52] U.S. Cl. ........................ 33/1 AP, 33/75, 33/101, 33/150
[51] Int. Cl. ............................................. B43l 9/08
[58] Field of Search....33/1 AP, 174 G, 98, 102, 150, 33/75

[56] References Cited
UNITED STATES PATENTS
2,419,597   4/1947   Rushmore ............... 33/102 X
1,181,388   5/1916   Joiner ..................... 33/1 AP X
2,222,853   11/1940  Neurohr .................. 33/1 AP
2,208,137   7/1940   Raettig ................... 33/1 AP X Primary Examiner—William D. Martin, Jr.
Attorney—Victor J. Evans & Co.

[57]   ABSTRACT

Transparent plastic T-square, dual blade, and protractor devices for performing geometrical and trigonometrical measurements with particular emphasis on trisecting angles and dividing angles into a plurality of equal segments.

3 Claims, 21 Drawing Figures

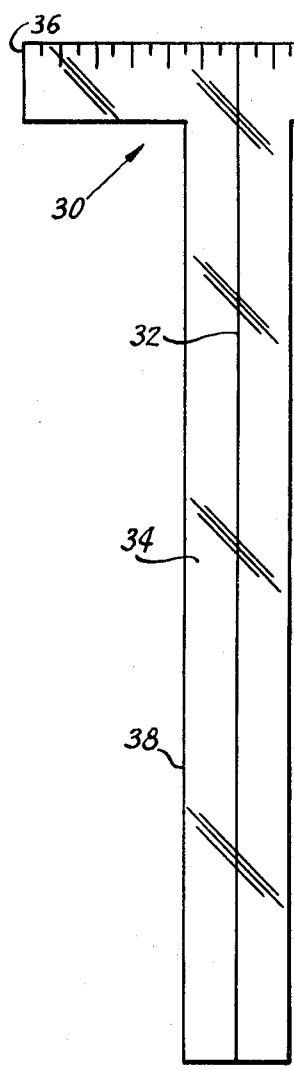
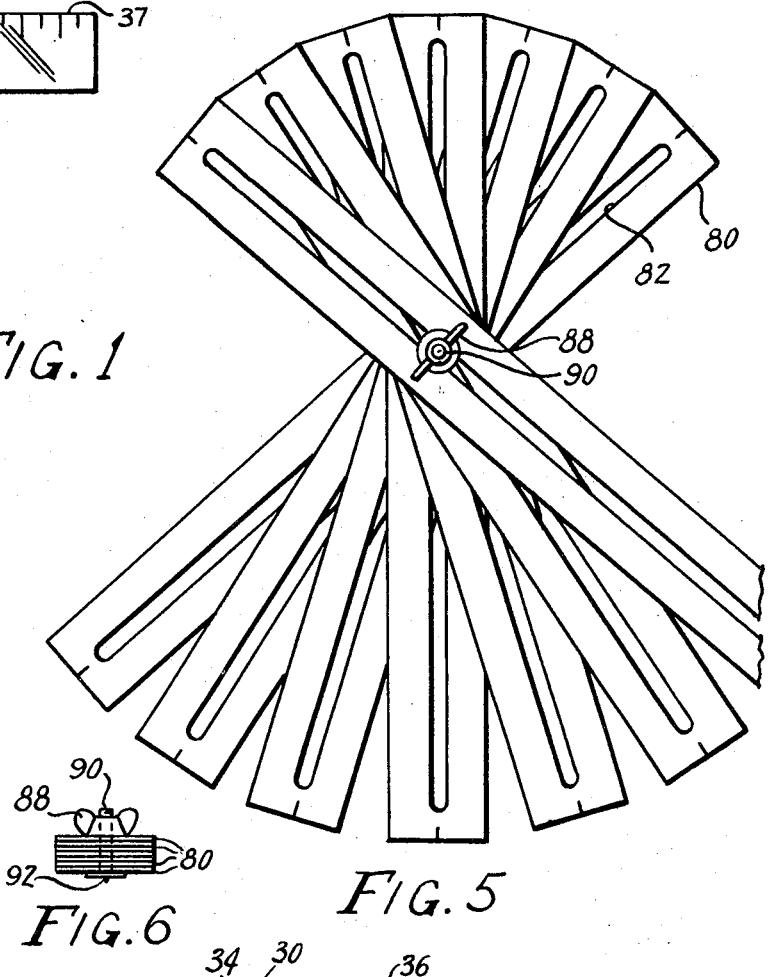
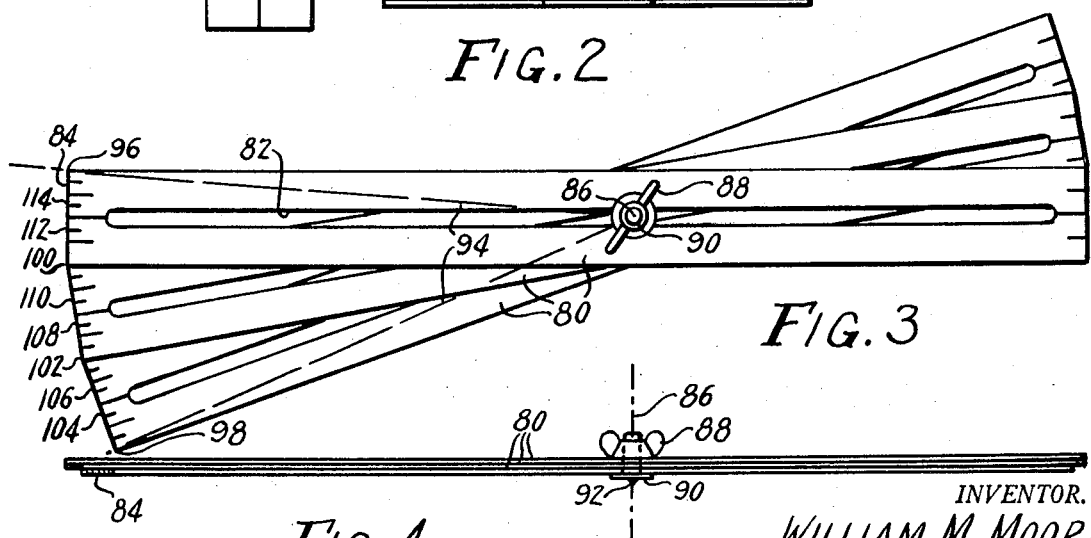

INVENTOR.
WILLIAM M. MOORE
BY
Victor J. Evans &Co.
ATTORNEYS.

PATENTED SEP 26 1972 3,693,261

INVENTOR.
WILLIAM M. MOORE
BY
Victor J. Evans &Co.
ATTORNEYS.

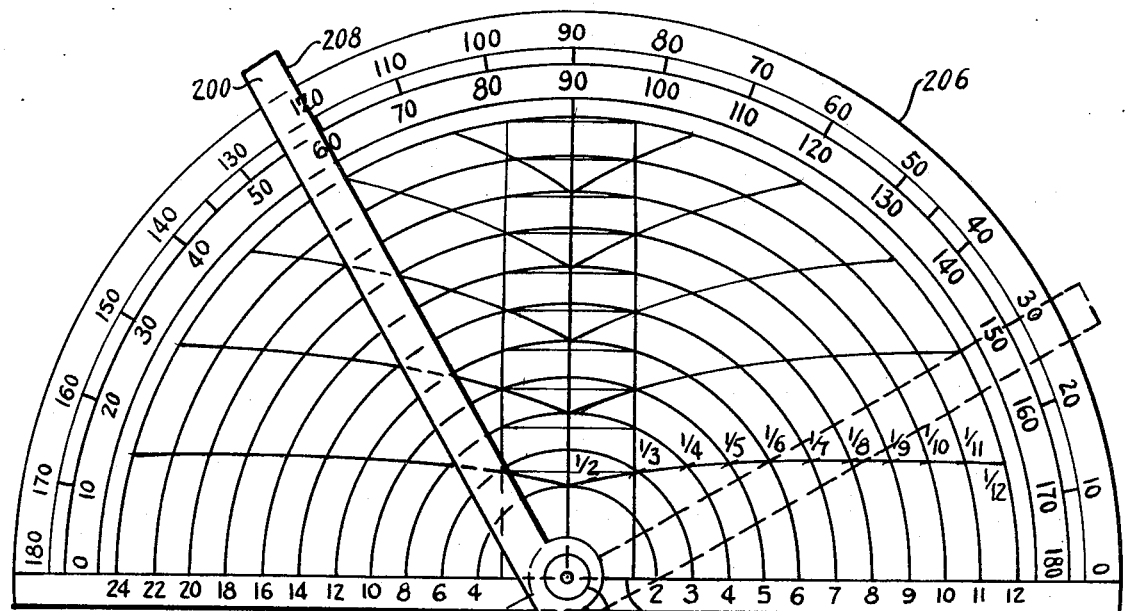
FIG. 17
FIG. 18
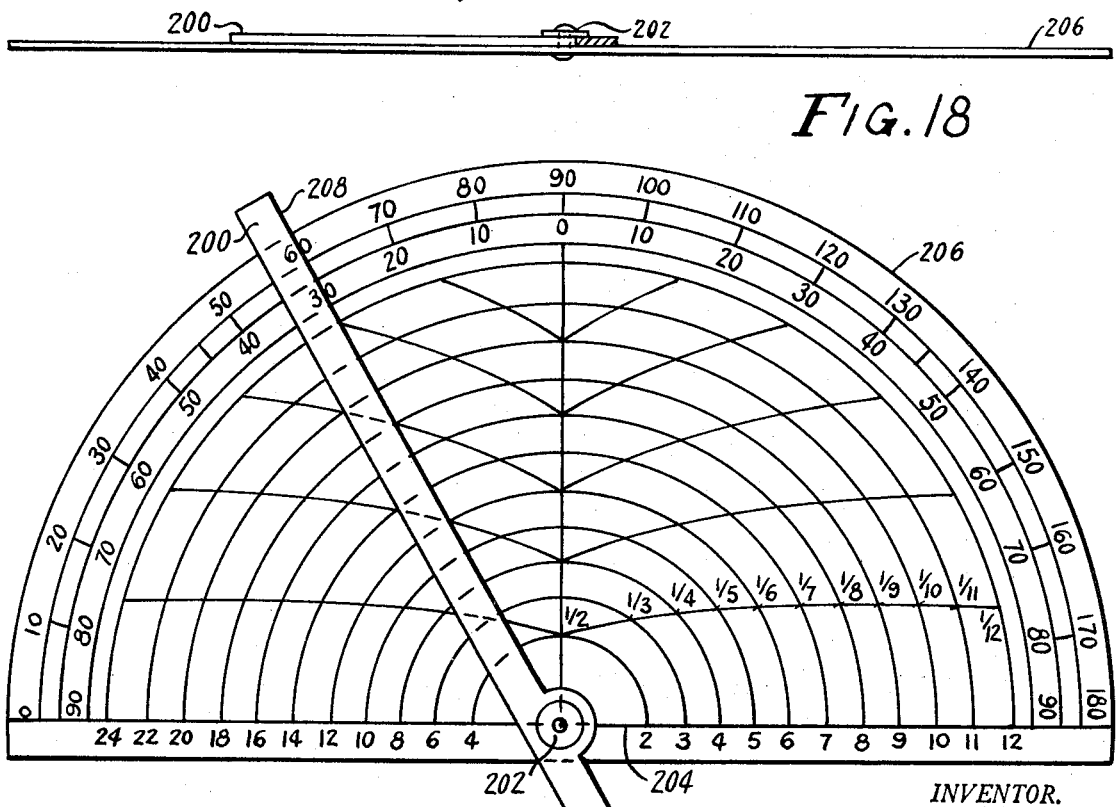
FIG. 19
INVENTOR.
WILLIAM M. MOORE
BY
Victor J. Evans &co.
ATTORNEYS.

3,693,261

ANGLE TRISECTOR

This invention relates to devices for trisecting angles and performing other types of geometrical and trigonometrical tasks.

Dividing an angle into a plurality of parts has heretofore been solved either by completely manual or a combination of manual and instrument steps involving several different tedious steps and inaccurate results, the instruments being namely either the common compass or the conventional protractor. This invention facilitates the procedure by which an angle is divided up by means of a completely novel method of achieving equal angular segments and by completely novel instruments for rapidly and accurately accomplishing the desired results.

Accordingly, a primary object of this invention is a new use for conventional tools in dividing an angle into a plurality of segments.

Another object of this invention is to provide a device which divides an angle into the desired number of equal segments without the necessity of aid from present conventional tools.

A further object of this invention is to provide devices which allow division of angles in a more accurate and rapid manner.

The above and other objects of the invention will become apparent to those skilled in the art after consideration of the following detailed description of the preferred embodiments of this invention taken together with the accompanying drawings in which:

FIG. 1 is a top plan view of one form of the invention;

FIG. 2 is a side elevation of the structure illustrated in FIG. 1;

FIG. 3 is a top plan view of another form of the invention;

FIG. 4 is a side elevation of the structure illustrated in FIG. 3;

FIG. 5 is a top plan view of still another form of this invention;

FIG. 6 is a side elevation of the structure illustrated in FIG. 5;

FIGS. 17 and 19 are top plan views of still a further form of this invention;

FIG. 18 is a side elevation of the structure shown in FIG. 17;

Figure 20:
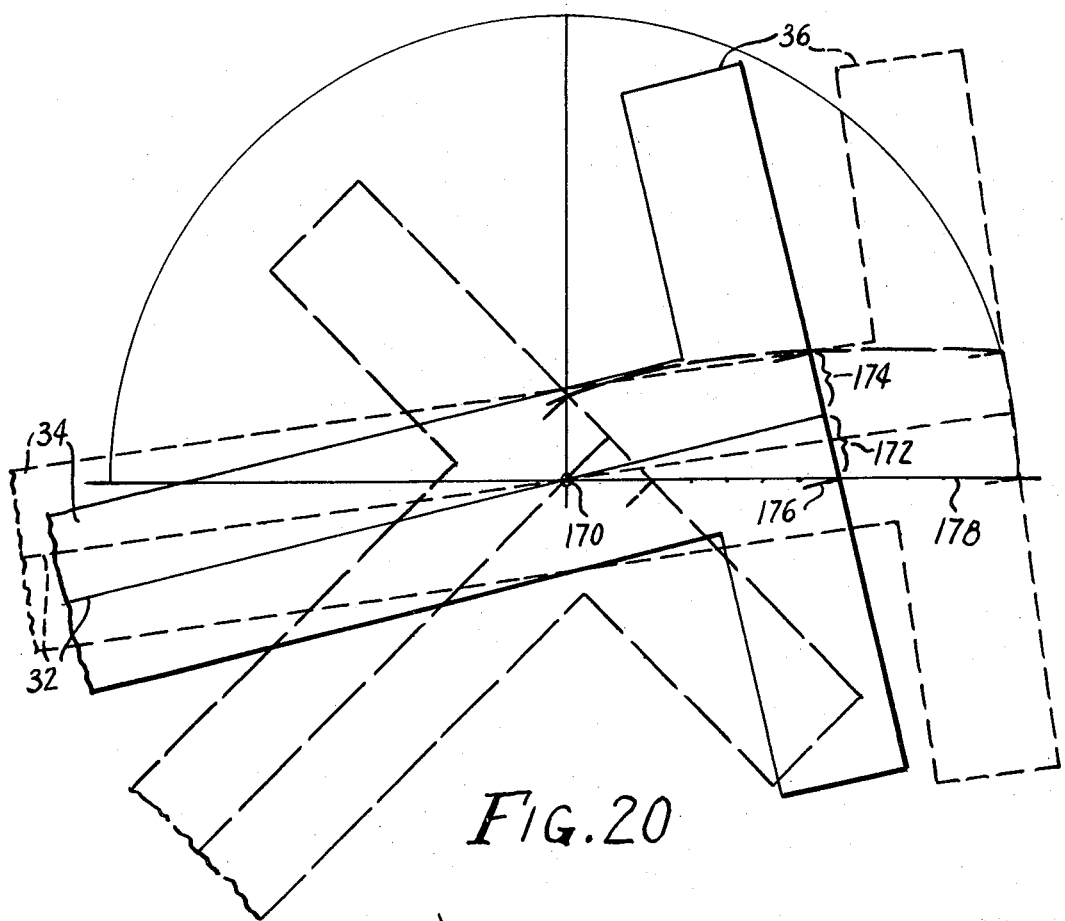
Figure 21:
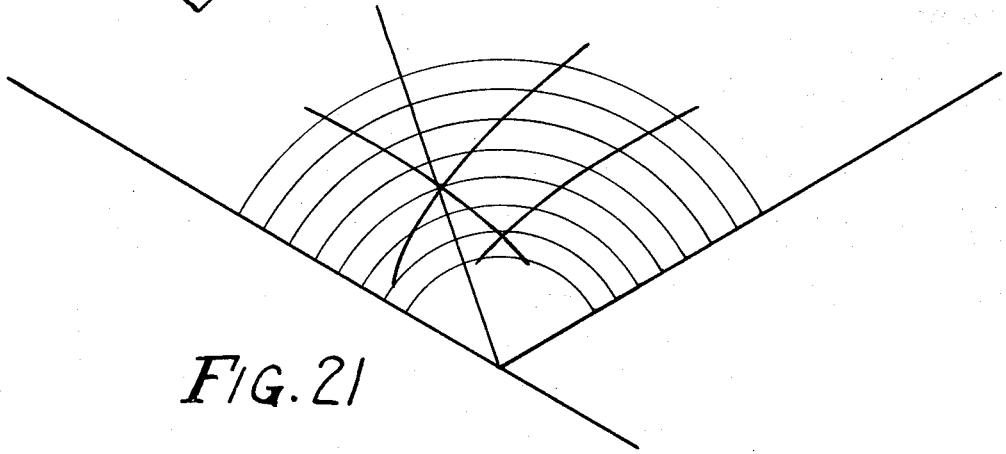

FIG. 20 is a top plan view of the structure shown in FIG. 1 being used to construct the devices of FIGS. 13 through 15 and FIGS. 17 through 19; and FIG. 21 is a diagrammatic view of an angle being divided in the manner illustrated in FIGS. 16 through 19.

Referring in detail to the drawings, a transparent plastic T-square 30 having a center line 32 along its length 34 and graduated divisions along the short horizontal transverse portion 36 is disclosed in FIGS. 1 and 2. T-square 30 facilitates the trisecting of any angle such an angle 50 in FIG. 12.

Figure 12:
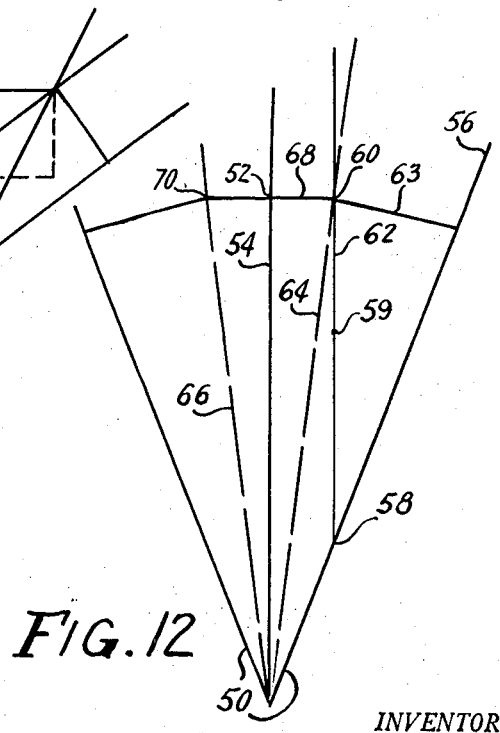
FIG. 12 is a diagrammatic view illustrating the trisecting of an angle pursuant the present invention.

Angle 50 of FIG. 12 is first divided in half by using equal graduations of portion 36 and center line 32 to draw a point 52, a line 54 being drawn through the vertex of angle 50 and point 52. The edge 38 of T-square 30 is then placed on line 54 and the intersection of horizontal portion 36 with the right leg 56 of angle 50 at any point along right leg 56 is marked off as a reference point 58. The distance between point 58 and line 54 is measured by means of the graduations on horizontal portion 36. An equal distance is measured off at any other point 59 and a line 62 is drawn through points 58 and 59 parallel to line 54. Next, edge 38 of T-square 30 is placed at the vertex of angle 50 and is positioned so that the distance along edge 37 of portion 36 between edge 38 and line 62 is equal to the distance between edge 38 and line 56 and is equal to the distance between line 62 and line 54. A line 63 is then drawn along edge 37 meeting line 62 at point 50. A line 64 is drawn through the vertex of angle 50 and point 60, the angle between line 64 and line 56 being one-third of angle 50. A line 66 completing the trisection of line 50 is determined by merely using the T-square to draw a line 68 perpendicular to line 54 and intersecting point 60, a point 70 for drawing line 66 being determined by drawing point 70 the same distance from line 54 as that of point 60.

Figure 9:
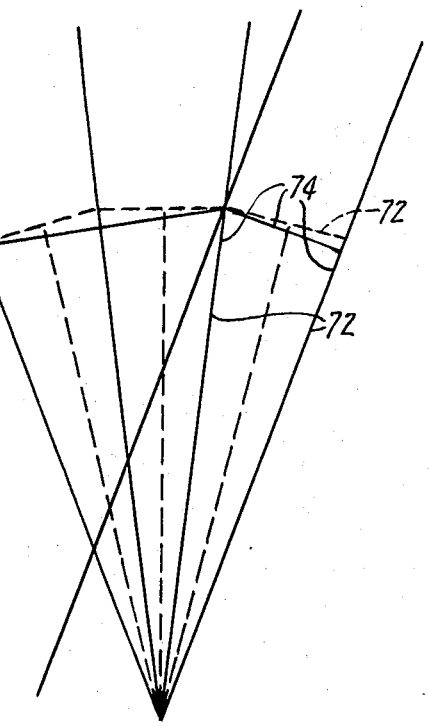
FIGS. 9-11 are diagrammatic views illustrating the trisecting of an angle pursuant the prior art.
Figure 10:
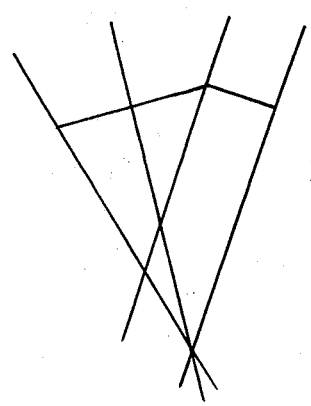
Figure 11:
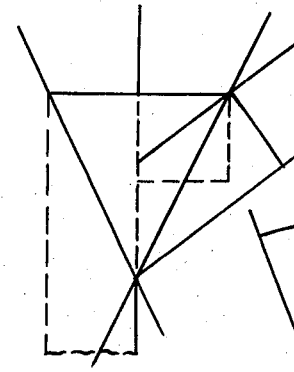

The prior art right angle triangle method of trisecting an angle is shown in FIGS. 10 and 11 in order to particularly point out and distinctly illustrate the differences between the prior art method and that of this invention. The major difference between the methods are illustrated in FIG. 9 where the diagram of FIGS. 10 and 11 is superposed over the diagram of FIG. 12. The method of this invention is based upon isosceles triangles 72 whereas the prior art method is based upon right triangles 74.

The trisector device shown in FIGS. 3 and 4 also operates on the isosceles triangle principle heretofore described. This device consists of three longitudinal blades 80 made out of thin steel having a longitudinal center groove 82 and having graduations at the ends 84 thereof. Blades 80 rotate about a common axis 86 by means of a wing nut 88 and pointer fastener 90 which fastens blades 80 together for rotation about axis 86 which coincides with a point 92 at the bottom of fastener 90, point 92 preventing slippage when an angle is being trisected. Thus, point 92 is placed at the vertex of an angle 94 to be trisected, and outer blades 80 are positioned at point 96 and 98 on the sides of angle 94. The angle is immediately trisected by points 100 and 102, the distances between points 96 and 100, point 100 and 102, and points 102 and 98 being equal to each other as was demonstrated in the diagram of FIG. 12. The graduations at the ends of blades 80 allow the process of trisecting to be utilized for very small angles. For instance, the smallest angle which could be trisected with the device of FIG. 3 would be an angle one side of which coincided with graduation 104, the first trisection point of which coincided with graduations 106 and 108, the second trisection point coinciding with graduations 110 and 112, and the other side of which coinciding with graduation 114. It should also be noted that blade 80 may be made of transparent plastic. Wing nut 88 and fastener 90 may be adjusted and placed at any location along longitudinal groove 82 in order to compensate for small and very large angles in the situation where the graduations at the ends 84 of blades 80 are not sufficient for accurate trisection. As illustrated in FIGS. 5 and 6, any number of blades 86 may be used, adding them on or taking them off fastener 90 as desired. FIG. 5 shows seven blades 80 which are capable of dividing an angle into seven equal parts.

Figure 7:
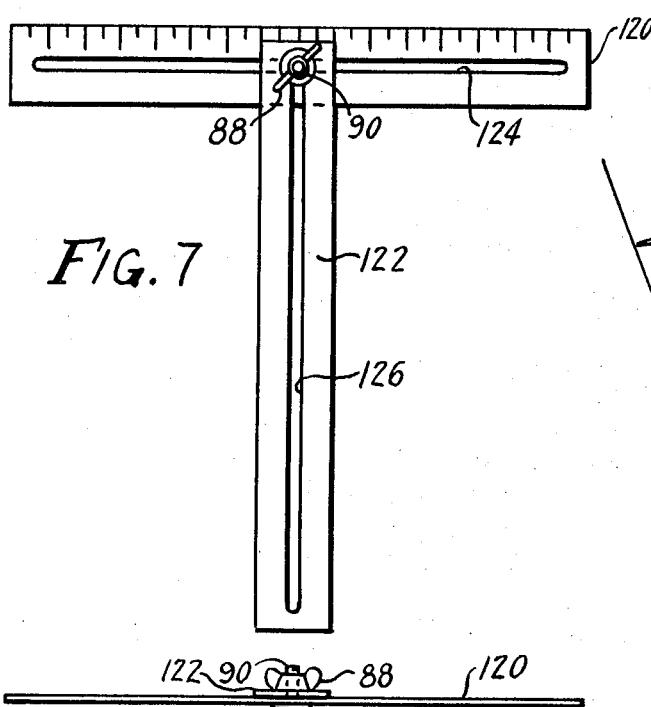
FIG. 7 is a top plan view of still another form of this invention.
Figure 8:
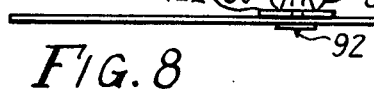
FIG. 8 is a side elevation of the structure illustrated in FIG. 7.

The angle trisector of FIG. 7 is a variation of FIG. 1 in that it combines the features of the devices disclosed in FIGS. 3 through 6 with the manual method of trisecting an angle as was described in connection with FIG. 12. The graduated blade 120 and the blade 122 transverse thereto both have longitudinal center grooves 124 and 126 respectively, blades 120 and 122 rotating about fastener 90 so that they may be used as either a T-square or a bevel square.

Figures 13, 14, 15:
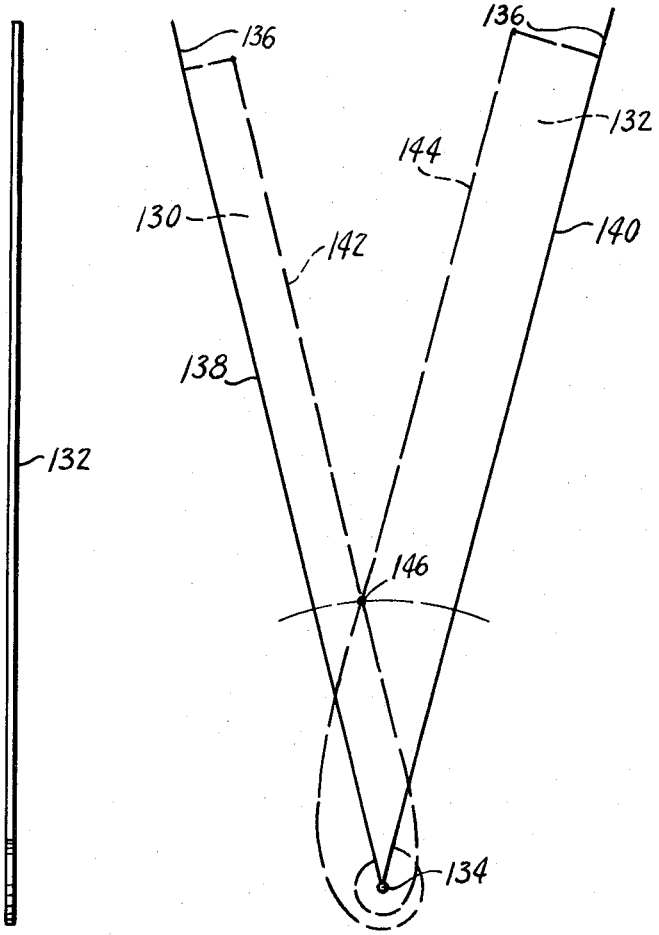
FIGS. 13 and 15 are top plan views of a further form of this invention.
FIG. 14 is a side elevation of the structure illustrated in FIG. 13.

Shown in FIG. 13 are two plastic transparent blades 130 and 132, each blade having a hole 134 at one end thereof. Blades 130 and 132 are laid over each other and pivoted about holes 134, as shown in FIG. 15, until edges 138 and 140 of blade 130 and 132 respectively coincide with any angle such as angle 136 which is to be trisected. It should be noted that holes 134 will always be placed at the vertex of the angle in order to match the size of the blades with the angle. The intersection point 146 of edges 142 and 144 of blades 130 and 132 respectively forms one of the trisection points of the angle when a line is drawn between point 146 and the vertex of the angle. FIGS. 13-15 show the dual blade angle trisector.

Figure 16:
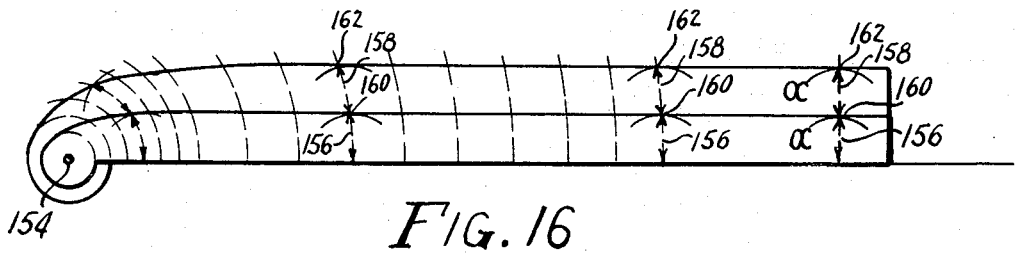
FIG. 16 is a diagrammatic view showing the construction of the device shown in FIGS. 13-15.

Blades 130 and 132 may be constructed by a ruler and compass as illustrated in FIG. 16. Arcs are drawn out to infinity by a compass having a center point at point 154 which coincides with holes 134 of FIGS. 13 and 15. Equal segments 156 and 158 are marked off by a compass along each arc and are then connected by a line drawn through each point 160 and a line drawn through each point 162, these lines representing edges 142 and 144 respectively of blades 130 and 132. It should be noted that blades 130 and 132 may be constructed to divide an angle into any number of parts by merely varying the relationship of the segments 156 and 158 to each other.

It should be noted that rather than using a compass and ruler for constructing blades 130 and 132, the devices of FIG. 1 or FIG. 7 may be utilized to accomplish construction in a more rapid manner. Center line 32 intersects with a point 170 at all times while equal segments 172 and 174 are used to mark off lines as were shown in FIG. 16, the edge of graduation 176 being kept on base line 178 at all times. It should be noted that this operation can be facilitated further by inserting a pin through groove 126 of the device shown in FIG. 7 and placing the pin at point 170 so that the device will automatically slide past point 170 allowing the operator to easily guide graduation 176 along base line 178.

FIGS. 17 through 19 show a linear protractor device for dividing a circle based upon the same principles as has been illustrated in connection with FIG. 16. This principal may be used for dividing up any angle into any desired segments as illustrated in FIG. 21. The semi-circle of FIGS. 17 and 19 and the angle of FIG. 21 may be constructed by the angle trisector of either FIG. 1 or FIG. 7 in the same manner as was described with regard to FIGS. 16 and 20. It should be noted that when using the procedure of FIG. 20, the line shown marked off by segment 174 becomes the new base line 178 for marking off the succeeding lines, graduation 176 now being guided along the new curved base line. Arm 200, shown in FIGS. 17 through 19, is pivoted about a fastener 202 at the center of the semi-circle base line 204 and slides over the flat top surface of a graduated semi-circle 206 for facilitating position of the circle or semi-circle by matching up the edge 208 of arm 200 with the appropriate marking for the desired segment to be divided. Arm 200 is shown in FIGS. 17 and 19 at the one-third marking for dividing the semi-circle into three parts or the one-sixth marking for dividing a circle into six parts.

While the preferred embodiments of this invention have been illustrated and described, it will be understood by those skilled in the art that modifications and changes may be resorted to without departing from the spirit and scope of the invention.

I claim:

1. An angle divider, comprising:
a plurality of blades, each blade having a longitudinal cut out along the length thereof at the center thereof;
a fastener inserted through said cut outs, said blades being pivotally mounted about said fastener, the flat surfaces of said blades being adjacent each other, said blades having equal width so that when the corners of the ends of said blades coincide with each other, the angle between the outer end corners of the two outer blades of said plurality of blades is divided into a plurality of equal segments equal in number to said plurality of blades, an equal number of graduations along the edge of each end of said blades, an equal number of graduations from the center of each said blade determining equal angular segments of an angle whose legs coincide with an equal number of graduations at the outer side of the centers of the two outermost blades of said plurality of blades.

2. The angle divider of claim 1 wherein said fastener has a pointed bottom allowing said plurality of blades to be pivoted about the vertex of an angle that is to be divided without slippage.

3. The angle divider of claim 1 wherein said fastener may be moved along said longitudinal cutouts in order to automatically accommodate said plurality of blades, each blade having a fixed width equal to the rest of said blades, to the division of angles whose legs are further apart at one point than the end perimeter of said plurality of blades and angles which are too small at one point to be divided by single graduations of said graduations at the ends of said plurality of blades.

* * * * *